US008662988B2

(12) United States Patent
Graves

(10) Patent No.: US 8,662,988 B2
(45) Date of Patent: Mar. 4, 2014

(54) GAMING MACHINES AND METHODS PARTICULARLY FOR USE IN ENVIRONMENTS IMPOSING PRIZE RESTRICTIONS

(75) Inventor: Gordon Thomas Graves, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 666 days.

(21) Appl. No.: 12/649,693

(22) Filed: Dec. 30, 2009
(Under 37 CFR 1.47)

(65) Prior Publication Data

US 2011/0159943 A1 Jun. 30, 2011

(51) Int. Cl.
*A63F 13/00* (2006.01)

(52) U.S. Cl.
USPC .................... 463/20; 463/12; 463/15; 463/40

(58) Field of Classification Search
USPC .......................................... 463/12, 15, 20, 40
See application file for complete search history.

(56) References Cited

U.S. PATENT DOCUMENTS

| | | | | |
|---|---|---|---|---|
| 7,059,965 | B2 * | 6/2006 | Jackson | 463/16 |
| 7,704,136 | B2 * | 4/2010 | Shackleford et al. | 463/13 |
| 2005/0173863 | A1 * | 8/2005 | Walker et al. | 273/292 |
| 2006/0211468 | A1 * | 9/2006 | Flint et al. | 463/16 |
| 2007/0060242 | A1 * | 3/2007 | Moody | 463/13 |
| 2010/0099480 | A1 * | 4/2010 | Caputo | 463/12 |
| 2010/0120484 | A1 * | 5/2010 | Caputo et al. | 463/13 |
| 2010/0312625 | A1 * | 12/2010 | Miller et al. | 705/14.5 |
| 2011/0086689 | A1 * | 4/2011 | Kim | 463/11 |

* cited by examiner

*Primary Examiner* — Arthur O Hall
*Assistant Examiner* — Shahid Kamal
(74) *Attorney, Agent, or Firm* — Russell D. Culbertson, Esq.; J P Cody, Esq.

(57) ABSTRACT

Method, apparatus, and program products relating to a multi-mode game play. A player places a bet through a player station to commence play in a first play mode of a multi-mode game. The first play mode may award a prize specified as a number of plays at a different ("second") play mode. The second play mode has a different associated prize structure and a higher expected net value per play as compared to the first play mode. Once the player has played the specified number of plays at the second play mode the game switches back to the first play mode for additional plays.

14 Claims, 5 Drawing Sheets

| PAY TABLE | | | |
|---|---|---|---|
| Payline Symbols | | | Prize |
| Any 2 Glory 7s | | | 1X Bet |
| Single Bar | Single Bar | Single Bar | 3X Bet |
| Double Bar | Double Bar | Double Bar | 3X Bet |
| Triple Bar | Triple Bar | Triple Bar | 3X Bet |
| Red 7 | Red 7 | Red 7 | 5X Bet |
| White 7 | White 7 | White 7 | 5X Bet |
| Blue 7 | Blue 7 | Blue 7 | 5X Bet |
| Red 7 | White 7 | Blue 7 | 10X Bet |
| Glory 7 | Glory 7 | Glory 7 | 16 Super Plays |
| Glory 7 | Glory 7 | Glory 7 | 32 Super Plays |
| Glory 7 | Glory 7 | Glory 7 | 80 Super Plays |
| Glory 7 | Glory 7 | Glory 7 | 400 Super Plays |

*FIG. 4*

| Prize | Frequency Per Million | Expected Net Value (in credits) | |
|---|---|---|---|
| 1X Bet | 20,000 | 20,000 | 501 |
| 3X Bet | 60,000 | 180,000 | 502 |
| 5X Bet | 60,000 | 300,000 | 503 |
| 10X Bet | 25,000 | 250,000 | 504 |
| 16 Super Plays | 2,000 | 80,000 | 505 |
| 32 Super Plays | 1,000 | 80,000 | 506 |
| 80 Super Plays | 50 | 20,000 | 507 |
| 400 Super Plays | 5 | 5,000 | 508 |

*FIG. 5*

| Prize | Frequency Per Million | Expected Net Value (in credits) |
|---|---|---|
| 0 | 125,000 | 0 |
| 1X Bet | 250,000 | 250,000 |
| 3X Bet | 250,000 | 750,000 |
| 5X Bet | 250,000 | 1,250,000 |
| 10X Bet | 125,000 | 1,250,000 |

*FIG. 6*

GAMING MACHINES AND METHODS PARTICULARLY FOR USE IN ENVIRONMENTS IMPOSING PRIZE RESTRICTIONS

TECHNICAL FIELD OF THE INVENTION

The invention relates to apparatus, methods, and program products for playing games of chance. More particularly, the invention relates to systems which may be used to provide desirable play characteristics in a regulatory environment which imposes prize limitations for a given play in a game.

BACKGROUND OF THE INVENTION

A number of different games of chance may use electronic gaming machines as an interface through which players may participate in the game. For example, electronic gaming machines (also known as "player stations") may be used to imitate a traditional mechanical slot machine, a poker game, blackjack game, or other traditional casino games. Electronic gaming machines may also be used to play lottery games, bingo and games similar to bingo, and other games of chance that are not necessarily related to any traditional casino game.

Electronic player stations are commonly housed in a large and oftentimes stand alone cabinet. The cabinet includes a front side on which is mounted a game display such as a suitable video display and/or a suitable mechanical display (a series of rotatable reels, for example) along with player controls. Player controls may include various types of mechanical controls such as switches, buttons, and levers mounted on a forwardly extending ledge below the game display. Player controls may also be incorporated into a video display portion of a game display using touch screen technology. In addition to the game display and basic player controls through which the player makes choices or takes action in the game offered through the player station, a player station may also include other player interface devices such as coin or paper currency acceptors, player card or credit card acceptors, keypads, and other player interface devices.

Player stations may be either "stand alone" or "networked." "Stand alone" player stations have the necessary electronics, ancillary equipment and power supply to operate by themselves with some routine maintenance. These player stations are most often found in locations such as bars, convenience stores, and the like that accommodate a limited number of gaming machines. "Networked" player stations are linked to a communications network and are most commonly found in locations of heavy use, such as casinos, game arcades and bingo halls, for example, although networked player stations may also be located at small scale gaming venues such as bars, convenience stores, and the like. The network through which a player station communicates with external devices typically includes a number of player stations in communication with one or more servers that perform functions associated with game play such as accounting, player tracking, and result generation, for example.

In most electronic player stations that are housed in a cabinet, whether stand alone or networked, various graphic displays may be located above and/or below the game display on the front side of the cabinet. These additional graphic displays may be implemented with video display monitors or may be in the form of static graphic displays, and generally provide information regarding the game offered through the player station such as pay tables and other game related information. These additional graphic displays also commonly include colorful and attractive graphics that are coordinated with the graphics shown on the game display in the course of game play. The graphic display located above the game display is commonly referred to as the "top glass," whereas the graphic display located below the game display is commonly referred to as the "belly glass." When additional graphic displays are used, these may also incorporate non-static elements such as counters or numeric displays for showing bonus or progressive play information and other time-varying play information.

The look of a particular game to a player at a player station may be referred to as a "game presentation." The game presentation for a given game includes the graphics displayed on any video game display included in the player station, any visible presentation shown on mechanical display devices included in the player station, and associated graphics shown on the top glass and belly glass. For example, a video display-based player station providing a game presentation imitating a mechanical slot machine will include graphics displayed on the game video display to imitate a number of rotatable reels. In response to a player control, these representations of reels are "set in motion" using suitable graphics display techniques. Graphics display techniques are then used to make the simulated rotating reels appear to stop at some final stop position that indicates the outcome of the play. The top glass and belly glass will commonly have graphics associated with a theme of the imitated slot-type game, and a payout table showing payouts for various reel stop positions. As another example, a player station providing a game presentation imitating a poker game may include animated graphics displayed on the game video display showing a card deal and allowing the player to see the cards they are dealt and perhaps certain cards dealt to the house or other players depending upon the specific type of poker game being portrayed. The top and belly glass graphics which are part of the poker presentation may be related to the poker theme and may also include payout tables for the poker game, game rules, and other information.

The game presentation of a player station may depict the actual game offered through the player station or some other game of chance. An example of an electronic player station that depicts the actual game being played is a slot machine type game in which the player station or some associated piece of equipment executes a program to independently pick the reel stop positions for a given play, and thus determine the outcome of the play. A video lottery player station is an example of an electronic player station that may depict a game different from the game actually being played to determine a win/loss result. In video lottery player stations, the win/loss result is determined by a predetermined video lottery ticket or data record that is selected from a set of such records in response to a game play request. The game video display of a video lottery player station may simply show a representation of the predetermined lottery record selected for a given game play request. However, the graphics provided on the game video display may alternatively provide a presentation of a different game such as a presentation including a representation of spinning reels imitating a traditional mechanical slot machine, or a representation of a horse or dog race, or a representation of a card game. The stop position is dictated by the result associated with the predetermined video lottery record selected in response to a game play request entered through the video lottery player station.

Games of chance available through electronic player stations are commonly regulated by one or more governmental authorities. Many jurisdictions in fact ban games of chance that are played through electronic player stations. Other jurisdictions allow electronic player stations offering games of chance, but place various limitations on the games. One common type of limitation that may be placed on a game of chance offered through an electronic player station relates to the types of prizes that may be awarded in the course of the game. In particular, the prize value may be limited to some relatively small multiple of the bet placed in the game or to some relatively small cash value. For example, a game of chance implemented through an electronic player station may be limited to prizes no greater than ten times the bet placed in the game, or no greater than five dollars, whichever is less.

Limitations on the prizes that may be offered in games played through electronic player stations greatly constrain game designers. Typically, it is desirable to provide a fairly large number of available prizes in a game, with some reasonable number of relatively low-value prizes and at least a few high-value prizes. The chances of winning one of the relatively low-value prizes on a given play in the game may be relatively high compared to the chances of winning one of the high-value prizes. These types of diverse prize structures having both relatively low-value and relatively high-value prizes are believed to be more attractive to potential players. Thus, game regulations limiting the prizes that may be offered in a game to relatively low-value prizes tend to limit the popular appeal of the games and minimize play in the games.

SUMMARY OF THE INVENTION

In general, the present invention provides a game of chance having multiple play modes where at least one of the potential prizes in one play mode is a specified number of plays in another play mode. The present invention includes methods for conducting a game of chance, apparatus for conducting a game of chance, and software program products for implementing a game of chance.

In one embodiment, a method according to the invention includes authorizing a first game play at a player station that initially operates in a first play mode. This first play mode has an associated first prize structure that associates each prize available in the first play mode with a respective chance/probability of winning the respective prize on a given play. By defining prizes and chances/probabilities of winning the various prizes available in the game, the prize structure sets an expected net value per play in the game. According to the present invention, the first prize structure includes among its prizes at least one prize defined in terms of a specified number of plays in the game of chance at a second play mode. This second play mode has an associated second prize structure that provides a second expected net value per play which is greater than the first expected net value per play associated with the first play mode.

Although the prize structure of the second play mode provides a higher expected net value per play than the first prize structure, the prizes might be the same and the chances of winning one or more of the prizes may be higher in the second mode of play than in the first mode of play. The invention is of course not restricted to games where prizes in the first and second modes of play are the same. Both prizes and chances of winning the prizes may be allowed to change from one mode to the next, as long as the second mode of play provides a higher expected net value per play. This particular type of game, with multiple modes, each mode with its own associated prize structure, and with certain prizes defined as some number of plays at another mode of play is especially suitable for use in situations where the prize value for a single play in a game is limited by custom, rule, or regulation. The specified number of plays at the second play mode having the higher expected value per play provides the game designer with an opportunity to provide a game having desirable overall payout characteristics without violating limitations on payouts for individual plays in the game.

The invention also provides player stations and software program products which are downloadable or otherwise transferable to memory devices accessible by the player stations. In one embodiment, the player station is a stand alone unit and includes at least: a user interface, a game display, a processing unit, and software that has game instructions that are executable on the processor. According to the invention, when player stations are part of a network, the programming software may be stored either on a local memory device or on a remote memory device (on a server) in electronic communication with the player station. Likewise, in networked player stations, the processor may be located at a server remote from the player station, and in communication with the player station. The software includes game playing instructions for a game of chance, in accordance with the invention, that has at least two play modes. The game instructions utilize a first prize structure associated with a first play mode. The first prize structure includes at least one prize that awards a specified number of plays in a second play mode, and may include other possible prizes. The second mode utilizes a second prize structure that is different from the first prize structure, and that has a higher expected value per play than the first prize structure.

These and other advantages and features of the invention will be apparent from the following description of the preferred embodiments, considered along with the accompanying drawings.

BRIEF DESCRIPTION OF THE DRAWINGS

The drawings included with this document and described below are schematic, not necessarily to scale, and show embodiments or portions of embodiments of the invention. The drawings are intended for illustrative purposes only, to facilitate an understanding of the invention. The invention is not limited to the embodiments of the drawings, and the drawings do not limit the scope of the invention as described and claimed herein.

FIG. 4 is a pay table that may be used in a first play mode.

FIG. 5 is a table showing a prize structure that may be used in connection with the pay table of FIG. 4.

FIG. 6 is a table showing a prize structure that may be used in a second play mode according to one form of the invention.

DESCRIPTION OF ILLUSTRATIVE EMBODIMENTS

In one aspect of the invention, one play mode (a “first play mode”) of a game has a prize structure that includes at least one prize comprising a specified number of plays in a different play mode (that is, a “second play mode”). The prize structure for the second play mode has a higher associated expected net value per play than the first play mode. The present invention includes methods of providing games having such multiple play modes. The present invention also includes player stations and software program products relating to games of chance having multiple play modes.

The invention may be practiced on stand alone or networked player stations. The stand alone player stations should have access to the software program product that includes the game instruction set locally (e.g., on a memory device of the player station). If the player station is networked, other options are also available. For example, the software program product may be stored remotely (e.g. on a server accessible by several networked player stations). Generally, any suitable stand alone or networked electronic player station may be adapted for use in the invention.

Figure 1:
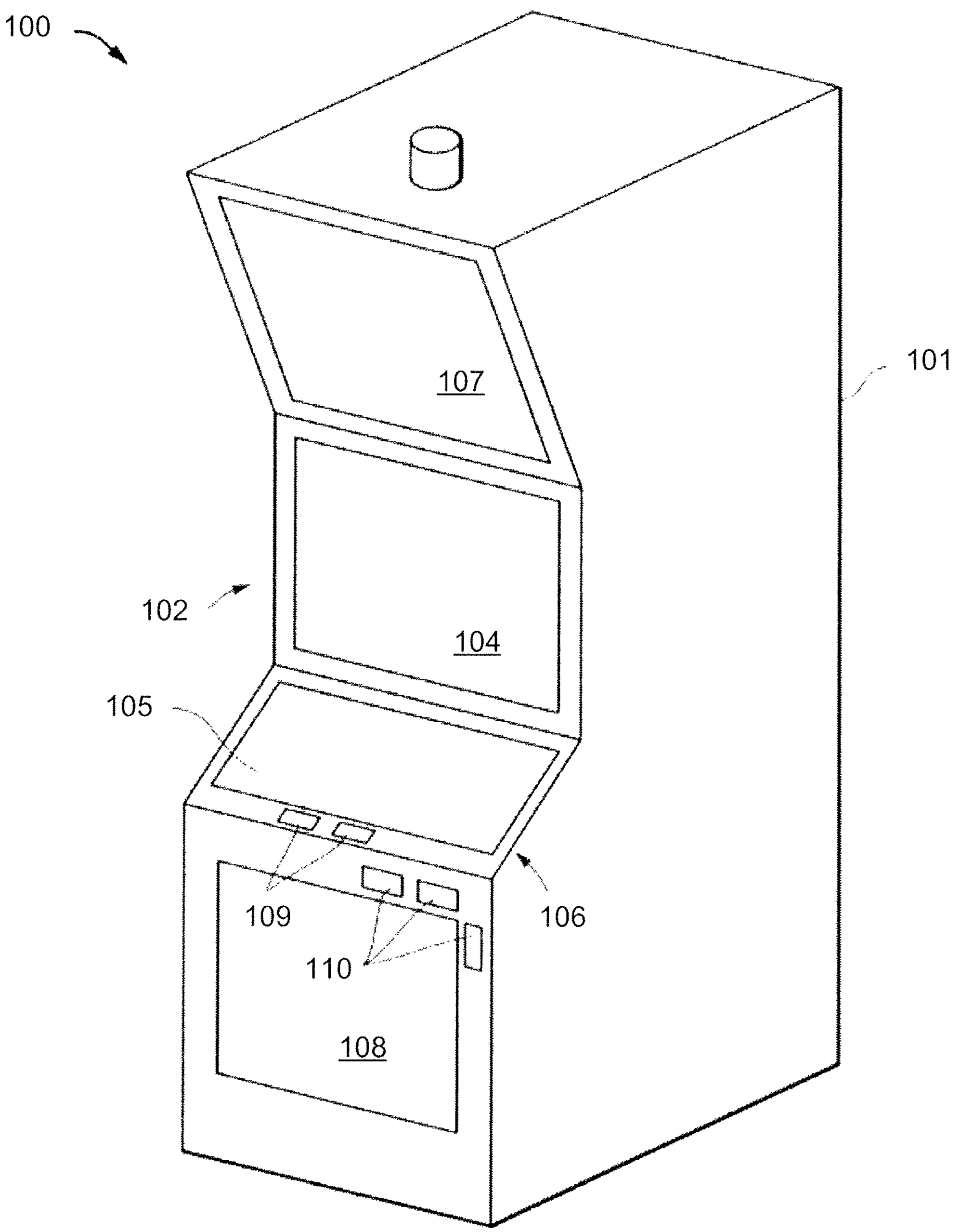
FIG. 1 is a schematic perspective view of an example of a player station suitable for use in the invention.
Figure 2:
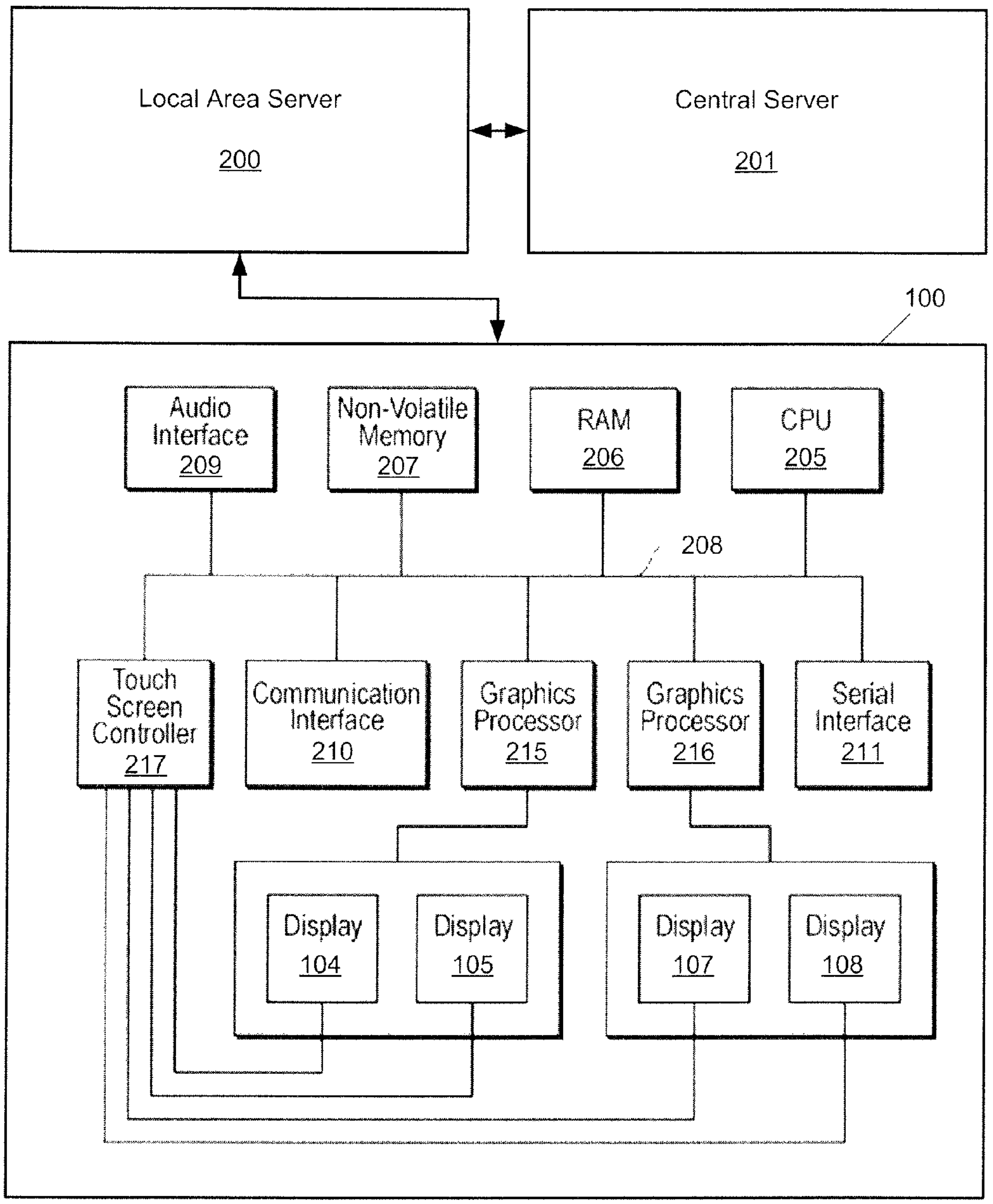
FIG. 2 is a block diagram illustrating significant components of an example player station and remote devices suitable for use in the invention.

As a preliminary matter, FIG. 1 shows an example of a player station 100 that may be used in implementing the present invention. The block diagram of FIG. 2 shows further details of player station 100 as part of a networked gaming system which may be used to implement the invention.

Referring to FIG. 1, a player station 100 includes a cabinet 101 having a front side generally shown at reference numeral 102. A game video display device 104 is mounted in a central portion of the front side 102 with a ledge 106 positioned below the game video display device and projecting forwardly from the plane of the game video display device. The game video display device 104 may be used to produce a graphic display of the results. Player station 100 illustrated in FIG. 1, includes as a player input interface, a player control touch screen display device 105. In addition to the separate player control touch screen display device 105, player station 100 also includes mechanical player control buttons or other input devices 109 mounted on ledge 106. Other forms of the invention may include switches, joysticks, or other player input devices mounted on ledge 106. However, all of the traditional player control inputs from devices such as switches, buttons, and pointer controls, can be provided through the illustrated touch screen display/player control device 105 and/or touch screen elements incorporated with the game video display device 104. Devices 107 and 108 are top glass and belly glass displays, respectively, and are represented as video display devices for the purpose of this disclosure.

It will be appreciated that player stations may also include player interface devices in addition to devices that are considered player controls for use in playing a particular game. Player station 100 also includes additional player interface devices 110 on a lower portion of cabinet 101. These additional player interface devices 110 may comprise for example, a player card reader, a voucher or ticket reader/issuer, a currency acceptor/validator, and/or a coin or token acceptor/dispenser.

Other player stations implementing the present invention may include more, fewer or different types of devices that show game play results. For example, a player station may include one or more mechanical reels in lieu of game video display 104 in FIG. 1. It should also be noted that the video display devices used in player station 100 or some other player station that may be used to implement the invention may each comprise any suitable video display device including a cathode ray tube, liquid crystal display, plasma display, LED display, or any other type of video display currently known or that may be developed in the future.

FIG. 2 provides a block diagram showing various components of the exemplified player station 100 together with gaming system components external to the player station. In particular, the example of FIG. 2 shows a player station 100 connected for communication with a local area server 200 and a central server 201. Local area server 200 and central server 201 may be used together with player station 100 and other player stations to implement a networked gaming system, such as the bingo gaming system described in U.S. patent application publication 2004-0152499-A1 or to implement a lottery gaming system such as the lottery gaming systems shown in U.S. patent application publication 2005-0137010-A1 or U.S. Pat. No. 6,733,385, for example. Regardless of the precise manner in which results are identified in a given system, local area server 200 and central server 201, or both, may cooperate to identify results that are provided to player station 100 in response to a result requesting input entered at the player station. That is, local area server 200 and/or central server 201, or more particularly, one or more processing devices associated with server 200 and/or server 201 may serve as a result processor for identifying results that are displayed by player station 100. Even in implementations in which results are produced at the player station 100 in some fashion, local area server 200 and/or central server 201 may be used to provide player tracking and accounting services for the player stations included in a gaming system. Of course, if player station 100 were a stand alone machine, it would not be connected to servers, and all applicable functions would be performed on the player station itself.

The player station 100 shown in FIG. 2 includes a central processing unit (CPU) 205 along with random access memory (RAM) 206 and nonvolatile memory or storage device 207. All of these devices are connected via a suitable bus system 208 with an audio interface device 209, communications interface 210, and a serial interface 211. Two graphics processors 215 and 216 are also connected via the bus system 208 to drive the display devices mounted on cabinet 101 (shown in FIG. 1). Graphics processor 215 controls game video display device 104 and player control display device 105. Similarly to processor 215, graphics processor 216 controls video display device 107 and video display device 108. The player station 100 shown in FIG. 2 also includes a touch screen controller 217 connected to bus system 208. Touch screen controller 217 is also connected to receive signals from touch screen elements associated with display devices 104, 105, 107, and 108. It will be appreciated that the touch screen elements themselves comprise thin films that are secured over the respective video display surface. These touch screen elements are not illustrated or referenced separately in the figures. It will also be appreciated that a player station that may be used in implementing the present invention may not include any touch screen elements, and instead may rely on other arrangements for receiving player inputs.

Those familiar with data processing devices and systems will appreciate that other basic components will be included in player station 100 such as a power supply, cooling systems for the various processors, audio amplifiers and speakers, and other devices that are common in gaming machines. These additional devices are omitted from the drawings so as not to obscure the present invention in unnecessary detail.

All of the elements 205, 206, 207, 208, 209, 210, and 211 shown in FIG. 2 may be mounted in any suitable manner within cabinet 101 shown in FIG. 1. Those familiar with data processing systems and the various data processing elements shown in FIG. 2 will appreciate that many variations on this illustrated structure may be used within the scope of the present invention. For example, since serial communications are commonly employed from a touch screen element secured over a video display surface, a system according to the invention may not include a separate touch screen controller 217. Rather, communications from the touch screen elements may be accommodated through any suitable peripheral interface such as a USB controller or an IEEE 1394 controller. Thus, the connections shown from touch screen controller 217 to the various display devices may alternatively run from the display devices (or more precisely the touch screen elements associated with the display devices) to the serial interface 211 or any other suitable interface. Numerous other variations in the player station internal structure and system may be used in accordance with the principles of the present invention. For example, it is also possible for CPU 205 to control the display devices directly without any intermediate graphics processor. The invention is not limited to any particular arrangement of graphics processors for controlling the gaming machine display(s).

In the illustrated player station 100, CPU 205 executes software which ultimately controls the entire player station including the receipt of player inputs and the presentation of various graphic components through one or more of the video display devices associated with the player station. Thus, CPU 205 either alone or in combination with one or more of the graphics processors 215 and 216 serves as a presentation processor. Where the player station itself produces results for a player, CPU 205 also serves as a result processor. CPU 205 may also execute software related to communications handled through communications interface 210, and software related to various peripheral devices such as those connected to the system through audio interface 209, serial interface 211, and touch screen controller 217. CPU 205 may also execute software to perform accounting functions associated with game play. RAM 206 provides memory for use by CPU 205 in executing its various software programs while the nonvolatile memory or mass storage 207 provides storage for programs not in use or for other data generated or used in the course of player station operation. Communications interface 210 provides an interface to other components of a gaming system that may be involved in game play or monitoring, such as local area server 200 and/or central server 201.

It should be noted that the invention is not limited to player stations employing the personal computer-type arrangement of processing devices and interfaces shown in example player station 100. Other player stations may include one or more special purpose processing devices to perform the various processing steps for implementing the present invention. Unlike general purpose processing devices such as CPU 205, these special purpose processing devices may not employ operational program code to direct the various processing steps.

Figure 3:
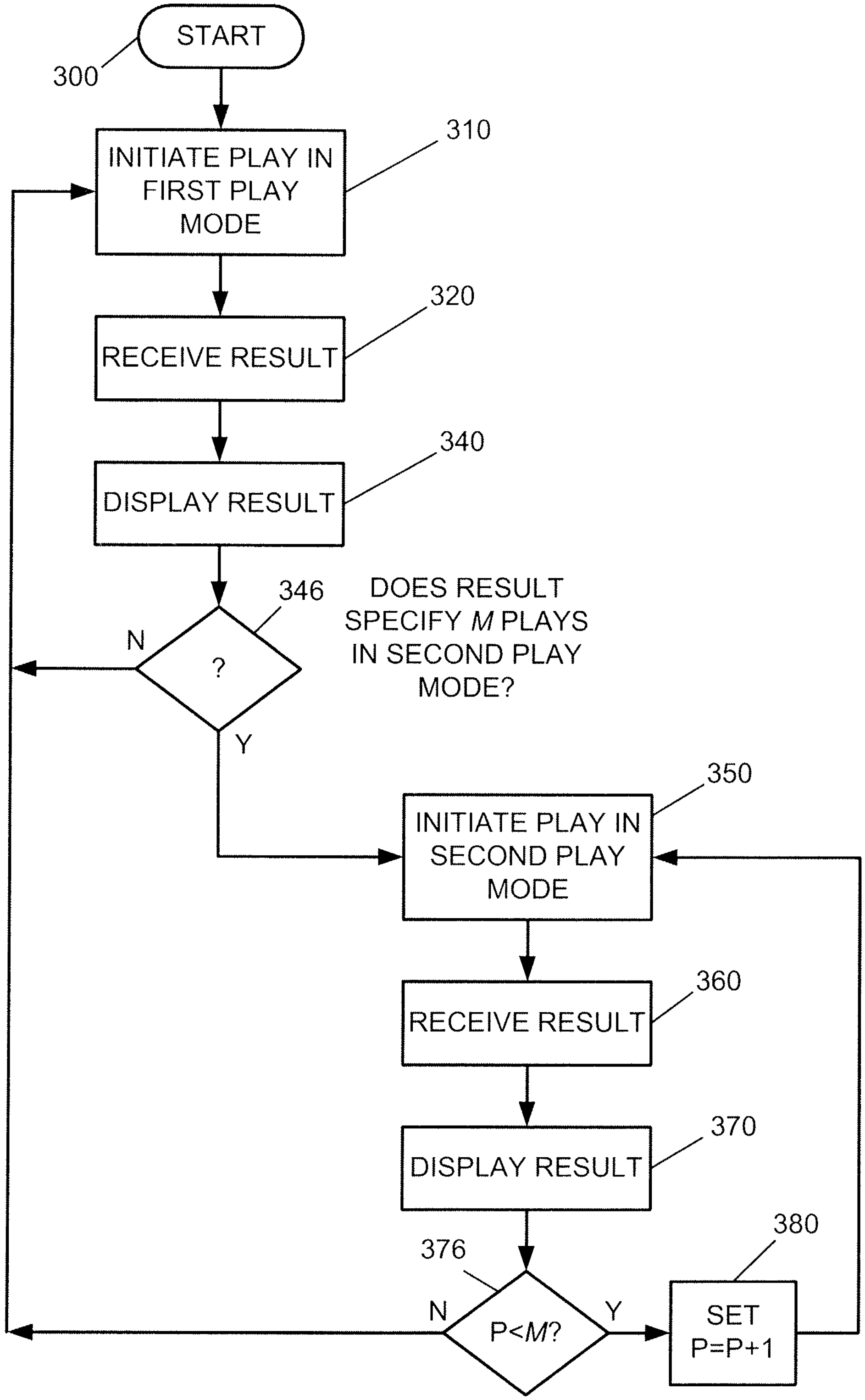
FIG. 3 is a flow diagram depicting a multi-mode gaming method in accordance with the present invention.

FIG. 3 is a flow diagram showing steps of one preferred method according to the invention. Other embodiments may have fewer or additional steps. In the embodiment of FIG. 3, the player is authorized to begin play at process block 300, after appropriate payment and credit issuance. The player places a bet and commences playing by pressing "Play" button or other device associated with a player station (100 in FIGS. 1 and 2) to initiate a play in a first play mode as shown at process block 310. In processes not apparent to the player, the player station receives a result from a suitable result generator as indicated at process block 320. The result generator is not limited to any specific type, but can be any of those generators that are in use or that may be devised. Non-limiting examples of result generators include a quasi-random number generator and random number/result mapping arrangement, an electronic lottery, a card game, a bingo game, and the like. The result is displayed (in any convenient and/or attractive graphic form) as shown at process block 340 in FIG. 3. The result displayed as indicated at process block 340 may be a winning result associated with some prize or a losing result that is not associated with any prize. The prize associated with a winning result may be some payout or physical object, in which case the step shown at process block 340 may also include awarding the respective prize to the player in some fashion such as by crediting the player's account, issuing a voucher, or in any other suitable fashion. Alternatively to a prize associated with some payout or physical object, a prize displayed as indicated at process block 340 in FIG. 3 may comprise some number "M" of plays in a second play mode. The number M, the number of plays awarded in the second play mode, can be any number of plays and will be defined by the prize structure for the first play mode. For example, the prize structure for the first play mode may define a prize as a relatively small number of plays in the second play mode, ten plays or so, or a large number of plays in the second play mode, on the order of one hundred plays or more.

If the prize for the play in the first play mode is not defined as some M number of plays in the second play mode as indicated by a negative result at decision block 346, then the process loops back to block 310 to wait for the next play in the first play mode. However, if the prize for the play in the first play mode is defined as a number of plays in the second play mode as indicated by a positive result at decision block 346, the player station switches to the second play mode, and awaits a game play input at the player station to initiate a play in the second play mode at process block 350. As in the first play mode, the input to initiate a play in the second play mode may include an input to place a bet and a separate "Play" input. Of course, the invention is not limited to this particular arrangement of inputs to initiate a play in the game in either the first play mode or the second play mode. Other game presentations may combine the selection of a bet and "Play" in a single input (made through a button or other control at the player station); and yet other game presentations may require additional player inputs to initiate a play in the game. It is also possible that the play in the second play mode is initiated automatically without any player input. In any event, once a play in the second play mode in initiated as indicated at process block 350, the player station receives a result for the play from a suitable result generator as shown at process block 360. This result received at process block 360 is generated according to a second prize structure having an expected value per play that is higher than the expected value per play associated with the first prize structure. In the illustrated process, the potential results in the second play mode are either a winning result associated with some prize or a losing result associated with no prize. In any event, the result is displayed as shown at process block 370. Regardless of the particular result which is received and displayed for the player, if the player has not used up all M awarded plays in the second play mode, the process loops back to allow the player or otherwise initiate another play in the second play mode at process block 350. Otherwise, if the player has already played all M plays in the second play mode that were awarded in view of the result in the first play mode displayed at process block 340, the process loops back to process block 310 where the player may initiate another play in the first play mode. The determination as to whether the M plays in the second play mode have all been used may be made in any suitable manner. FIG. 3 indicates that the determination is made using a counter in which the value M representing the number of plays awarded in the second play mode is compared to a counter value P which is initially set to zero for the first play of the number M initiated at process block 350. This comparison is shown at decision block 376 as the determination of whether P is less than M. A negative result at decision block 376 indicates that all M plays in the second play mode have been used, and the process loops back to process block 310. If the result of the comparison at process block 376 is affirmative, the value for P is incremented as shown at process block 380 before looping back to initiate another game play at process block 350.

The example process shown in FIG. 3 includes a first play mode and only one additional higher level play mode, the second play mode. However, it will be appreciated that the invention is not limited to only two play modes. Rather, the invention encompasses multiple higher level play modes. For example, the second play mode may be associated with a prize structure in which one or more prizes are defined in terms of some number of plays at a third play mode. In this case, if a player wins such a prize while playing in the second play mode, the process will follow a path similar to that shown through process blocks 350, 360, 370, 376, and 380, but with respect to the third play mode. Thus, a game with multi-play modes according to the invention may be generalized as follows: at each play mode n a number of plays in at "play mode (n+1)" could be awarded as a prize. The (n+1)th play mode has a prize structure that is different from the prize structure associated with the nth play mode, with a higher expected value per play than the prize structure for the nth play mode.

It should also be appreciated that the invention is not limited to a single play mode at a given level. For example, a prize structure associated with a first play mode may include one or more prizes defined in terms of a number of plays at one second level play mode and may also include one or more prizes defined in terms of a number of plays at a different second level play mode. The two second level play modes in this example will each be associated with a different prize structure and preferably the two different prize structures at the second level may have a different expected value per play.

In one particular embodiment of the invention, the original game mode that the player initiates has a prize structure that rewards the player either with (i) a number of plays at a second play mode, or with (ii) cash prizes of not more than ten (10) times the amount of the bet in the game or five dollars ($5), whichever is less, or with (iii) non-cash prizes having a wholesale value of not more than ten (10) times the amount of the bet in the game or five dollars ($5), whichever is less. The second play mode in this particular embodiment has an associated prize structure in which each prize again has either a cash value of not more than ten (10) times the amount of the bet for the play in the second play mode or five dollars ($5), whichever is less. The cash or non-cash prizes in the prize structure associated with the second play mode may or may not be the same as those specified in the prize structure associated with the first play mode. However, in this particular embodiment, the probabilities of obtaining the various prizes in the second play mode prize structure differ from the probabilities of obtaining the various prizes in the first play mode so that the prize structure for the second play mode results in a higher expected value per play.

The higher expected value per play associated with a game play mode above the first game play mode level may in fact be greater than one times the bet placed in the game whereas the expected value per play associated with the first game play mode will be less than one. An expected value greater than one times the bet for a given play mode means that for a given play in that play mode, the player is expected a return greater than the player's bet. However, the various prize structures for the various play modes should be selected so that the overall game provides a reasonable hold for the game provider/operator. It should also be noted at each prize structure used in a multi-mode game according to the invention, even the prize structures associated with the second and higher play modes preferably still do not guarantee a win on every play. Rather, each prize structure will incorporate losing results and thus for any given play in the game, regardless of play mode, there will be some probability that the play will return a losing result. Furthermore, each game play in the invention, whether at a first play mode or a higher play mode, preferably requires a separate bet in the game.

In general, the invention is especially useful when an applicable regulatory scheme limits the prizes available for any given play in a game to relatively small cash or non-cash prizes. Providing the second and higher level play modes according to the invention allows a player to have higher overall returns without violating the limitation associated with the return for a given game play. For example, a game may be limited to a maximum prize of ten times the player's bet, and have a first play mode in which a particular prize is defined as ten plays in play mode X. This play mode X may be associated with a prize structure in which the maximum prize is still ten times the player's bet, but provides an expected value of five times the player's bet for each play. Thus, assuming a player bets one credit for each of the ten plays at play mode X, the cumulative expected value of the ten plays at play mode X will be fifty credits.

In one embodiment of the invention, a player is not required to accept second mode plays when these are awarded in first play mode. The player may choose not to accept and to continue play in the first mode of play, even if the prize structure of second play mode has a higher expected net value per play. Of course refusing to accept plays having a higher expected value per play would not represent optimum play of the game.

Once a player commences play in a second play mode, the player is not required to play all the awarded second mode plays. For example, if 5 plays are awarded, a player may choose to use only 1, 2, 3, or 4 plays. A player may stop playing in the second play mode at any time. The player station may be configured to remain in the higher play mode for the defined number of plays regardless which player is playing at the player station. Alternatively, a player station may be configured to switch back to the first mode of play after a certain period of inactivity at the player station. In still another arrangement within the scope of the invention, the player station may include a player control that allows a player to switch back to the first or other lower level play mode rather than complete all plays that have been awarded to the player at a higher play mode. In any case, it will be appreciated that failing to complete game plays of an expected higher value per play would represent sub-optimum play of the game.

The following example is a specific version of the game playing methods of the invention, and is set forth for purposes of illustration. The invention is by no means limited to the following or any other example described herein.

EXAMPLE

Throughout the following example there are embedded parenthetical references to the process blocks shown in FIG. 3 to show the relationship between the steps in the example and the steps shown in FIG. 3. The game in this example employs a reel-type game presentation having three video generated or mechanical reels which define one or more three-symbol paylines. FIG. 4 shows a pay table for the example game. This pay table related various symbol combinations that align along a payline to a respective prize. FIG. 5 shows the prize structure associated with the first play mode in the example. As shown in FIG. 5, the prize structure associates a respective prize level with a frequency (per million plays in the game) in which the prize level will be hit to produce an expected net value at each prize level. The example prize structure shown in FIG. 5 includes a total of eight winning prize levels referred at 501-508. Prize levels 501 through 504 are expressed in terms of some multiple of the player's bet, whereas prize levels 505 through 508 are expressed in terms of a number of plays in the second play mode. The expected net values of the different prize levels add up to an overall expected payout for the game of 935,000 credits per million plays to produce an overall payout to the players of 93.5% of the total wagers and an overall hold for the game provider/operator of 6.5% of the total wagers. FIG. 6 shows the prize structure for the second play mode in the game. It will be noted from FIG. 6 that the second play mode prize structure uses the same prize levels as used in the prize structure shown in FIG. 5 for the first play mode with the exception that the prizes structure for the second play mode defines no prizes in terms of some number of plays at another play mode. This arrangement is convenient because it facilitates using the same reel symbol patterns shown in the pay table of FIG. 4. As discussed above, it is possible to use a different set of prizes for the first play mode prize structure and the second prize mode structure. However, additional payline definitions would have to be provided in the pay table for the game, or the second play mode would require a separate pay table correlating reel symbol patterns to the various prizes.

In an implementation of the present invention, the frequencies per million plays shown in the prize structures shown in FIGS. 5 and 6 are obtained through the particular result generating arrangement used to generate results for the various plays at the player station. For example, where a random or pseudo-random result generating process is employed, the process will be designed so that the indicated prizes will be awarded, on average, at the corresponding frequency. A first process would be used to generate results in the first play mode (320) and a second process would be used to generate results in the second play mode (360). In a lottery implementation, a first set of lottery records could be defined to implement the prize structure of FIG. 5 and a second set of lottery records could be defined to implement the prize structure of FIG. 6. In that case the first set of lottery records would be used for obtaining results in the first play mode (320) and the second set of lottery records would be used for obtaining results in the second play mode (360). As a final example, where bingo games are used to produce game play results, two different pattern maps as shown in U.S. patent application publication No. 2004-0048647-A1 (the entire content of which is incorporated herein by this reference) may be used to provide the two prize structures shown in FIGS. 5 and 6. One pattern map would be used for obtaining results in the first play mode (320) and the other pattern map would be used for obtaining results in the second play mode (360).

As indicated in FIG. 4, each outcome or result in the game correlates to a series of reel symbols aligned along a payline in the player station display. For example, to show the player that they have won back their bet, that is, they have won one times their bet on a given play, FIG. 4 indicates that the player station display will show that the spinning reels stop with two reels displaying the "Glory 7" symbols along the payline, with some other symbol making up the third symbol on the payline. As another example, to show that the player has won five times their bet for a given game play, the reels would stop showing either three "red 7" symbols, three "white 7" symbols, or three "blue 7" symbols aligned along the payline as indicated in FIG. 4.

Player participation in this example game is a simple two-step process: the player selects a bet amount, and presses "play" to initiate a play in the game in the first mode (310). Game results are received (320) and displayed (340) as spinning reels with the symbols on the reels corresponding to various game outcomes according to the pay table of FIG. 4. If result for the play is at any of the levels 501-504 as shown in FIG. 5, then the prize amount is credited to the player and that game play is over. However, if the result for the game play is any of the prize levels defined by a number of plays in the second play mode, that is, prize levels 505-508 in FIG. 5, then the player station switches to the second play mode for the player's next play in the game (350). The player may then play off the number of second mode plays awarded as the first play mode prize, one at a time. The player station preferably produces a distinct graphic display during the second mode play, and also preferably displays a message to inform the player that the game is in the second play mode. In any event, the player places each bet and initiates the respective second mode play (350) and an outcome is generated (360). The outcome is displayed in the reel graphic format (370). The outcome may result in a prize or no prize. Whether the player wins or loses, the player may continue to play in the second play mode until all of the awarded second mode plays have been used (376). After all of the plays in the second play mode have been used, the player station switches back to the first play mode for the next play initiated at the player station (310).

During the second play mode in this example, the original reel presentation and symbols are used to show the results in the second mode plays. Each of these second mode plays requires the player to wager the same bet that was entered in the first mode play which resulted in the win of second mode plays.

As indicated in FIG. 6, each second mode play in this example has an expected value of 3.5 times the bet, that is, the total expected net value in credits per million plays is equal to 3.5 million credits. It will be noted that similar to the prizes available for plays in the first play mode, no prize available in the second play has a value greater than ten times the amount of the bet placed by the player. Thus, these example pay tables are appropriate for use where regulations limit individual prizes to no more than ten times the amount of the bet. It should also be noted from FIG. 6 that in the second play mode there remains a possibility for each play that the respective play will be a losing play, providing no return to the player. Specifically, a losing play will occur statistically in 1 out of 8 plays (125,000 times per million plays in FIG. 6).

The foregoing example illustrates a specific, useful, non-limiting application of the invention. Other applications on different games and with different pay tables and other features are clearly within the scope of the invention as described and claimed herein.

It will be noted from FIG. 4 that the same symbol combination is associated with each of the first play mode prizes defined in terms of a number of plays in a second play mode. Thus, achieving this symbol combination will indicate to the player that they have won some number of plays at the second play mode, but will not indicate how many plays have been won. Other implementations of the invention may use different symbol combinations for the various prize levels defined in terms of a number of plays at a second mode.

As used herein, whether in the above description and examples or the following claims, the terms "comprising," "including," "carrying," "having," "containing," "involving," and the like are to be understood to be open-ended, that is, to mean including but not limited to. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above described preferred embodiments are intended to illustrate the principles of the invention, but not to limit the scope of the invention. Various other embodiments and modifications to these preferred embodiments may be made by those skilled in the art without departing from the scope of the following claims. Also, although the invention is well suited for providing pay table flexibility in regulatory environments in which maximum prize values are limited, the invention is by no means limited to application in these regulatory environments. The multiple mode game structure as described and set forth in the following claims may be employed where there are no restriction in prize that can be awarded in a game play.

The invention claimed is:

1. A method including:

(a) receiving a first wager at a player station, the first wager being received for a first game play;

(b) initiating the first game play at the player station and displaying a result for that respective game play through a display system of the player station, the first game play being in a first play mode associated with a first prize structure that provides a first expected net value per play and includes a prize level that correlates to a second play mode prize, the second play mode prize specifying a number of game plays in a second play mode which is associated with a second prize structure, the second prize structure providing a second expected net value per play that is greater than the first expected net value per play;

(c) when the result for the first game play correlates to the second play mode prize, switching the player station to operate in the second play mode so as to facilitate a respective game play in the second play mode at the player station for each of the number of plays specified by the second play mode prize; and (d) at the player station, receiving a second wager for a respective game play in the second play mode, and then initiating the respective game play in the second play mode at the player station and displaying a result for that respective game play through the display system of the player station.

2. The method of claim 1 wherein the first prize structure includes a prize level that correlates to an additional second play mode prize, the additional second play mode prize specifying a number of game plays in an additional second play mode which is associated with an additional second prize structure, the additional second prize structure providing a third expected net value per play that is greater than the first expected net value per play and is different from the second expected net value per play.

3. The method of claim 1 wherein the first prize structure and the second prize structure each includes a common set of prizes defined in terms of a fixed prize.

4. The method of claim 1 wherein the first prize structure includes two or more second mode prizes, each second mode prize specifying a respective number of plays in the second play mode.

5. The method of claim 3 wherein the probability of winning a respective prize included in the common set of prizes is higher in the second prize structure than in the first prize structure.

6. A player station comprising:

(a) a user interface;

(b) a visual display device; and (c) a processor accessing software programming stored on a local or remote memory device, the processor in communication with the user interface and the visual display device, the software programming being executable by the processor to:

(i) for a first wager entered through the user interface, initiate a first game play at the player station, the first game play being initiated while the player station is in a first play mode having associated therewith a first prize structure, the first prize structure including a prize defined as a specified number of plays in a second play mode, the second play mode having an associated second prize structure, the second prize structure having an expected net value per play higher than that of the first prize structure, (ii) in response to a result for the first game play correlating to the prize defined as the specified number of plays in the second play mode, cause the processor to switch the player station from the first play mode to the second play mode, and (iii) for a second wager entered through the user interface while the player station is in the second play mode, cause the processor to initiate a second game play at the player station in the second play mode.

7. The player station of claim 6 wherein the second prize structure includes no prize having a payout of more than ten times the second wager or no more than a specified monetary value.

8. The player station of claim 6 wherein the first prize structure includes a prize level that correlates to an additional second play mode prize, the additional second play mode prize specifying a number of game plays in an additional second play mode which is associated with an additional second prize structure, the additional second prize structure being different from the second prize structure.

9. The player station of claim 6 wherein the first prize structure includes a set of fixed prizes and the second prize structure includes the same set of fixed prizes.

10. A non-transitory computer readable medium storing a program product, the program product including:

(a) first play mode program code executable to initiate a first game play at a player station for a first wager and to cause a result for that respective game play to be displayed through a display system of the player station, the first game play being in a first play mode associated with a first prize structure that provides a first expected net value per play and includes a prize level that correlates to a second play mode prize, the second play mode prize specifying a number of game plays in a second play mode which is associated with a second prize structure, the second prize structure providing a second expected net value per play that is greater than the first expected net value per play;

(b) second play mode program code executable to (i), when the result for the first game play correlates to the second play mode prize, cause the player station to switch to operate in the second play mode so as to facilitate a respective game play in the second play mode at the player station for each of the number of game plays specified by the second play mode prize, and to (ii) upon receipt of a second wager for a respective play in the second play mode, initiate the respective game play in the second play mode at the player station and cause the display system of the player station to display a result for that respective game.

11. The non-transitory computer readable medium of claim 10 wherein the first prize structure includes no prize of more than ten times the first wager or no more than a specified monetary value.

12. The non-transitory computer readable medium of claim 10 wherein the first prize structure includes a prize level that correlates to an additional second play mode prize, the additional second play mode prize specifying a number of game plays in an additional second play mode which is associated with an additional second prize structure, and further including additional second play mode program code executable to facilitate a game play in the additional second play mode in response to the award of the prize level that correlates to the additional second play mode prize.

13. The non-transitory computer readable medium of claim 10 wherein the first prize structure includes a set of fixed prizes and the second prize structure includes the same set of fixed prizes.

14. The non-transitory computer readable medium of claim 13 wherein the probability of winning a prize is higher in the second prize structure than the probability of winning a prize in the first prize structure.

* * * * *